Figure 6:
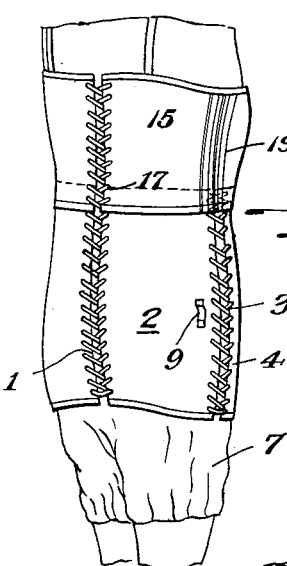

Sept. 26, 1933.   H. N. GRINAGER ET AL   1,928,101
FITTING GARMENT
Filed Dec. 3, 1929   2 Sheets-Sheet 1
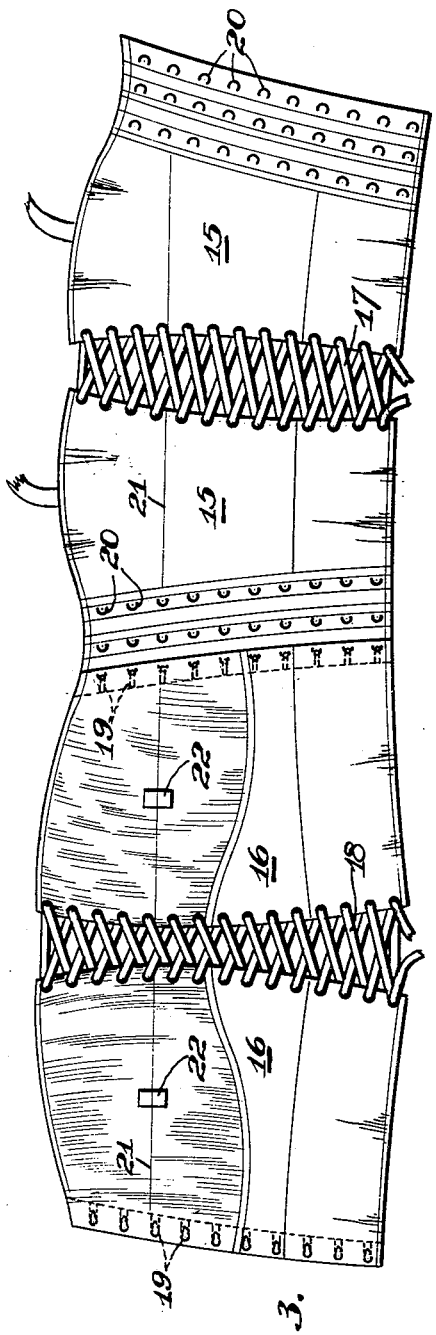
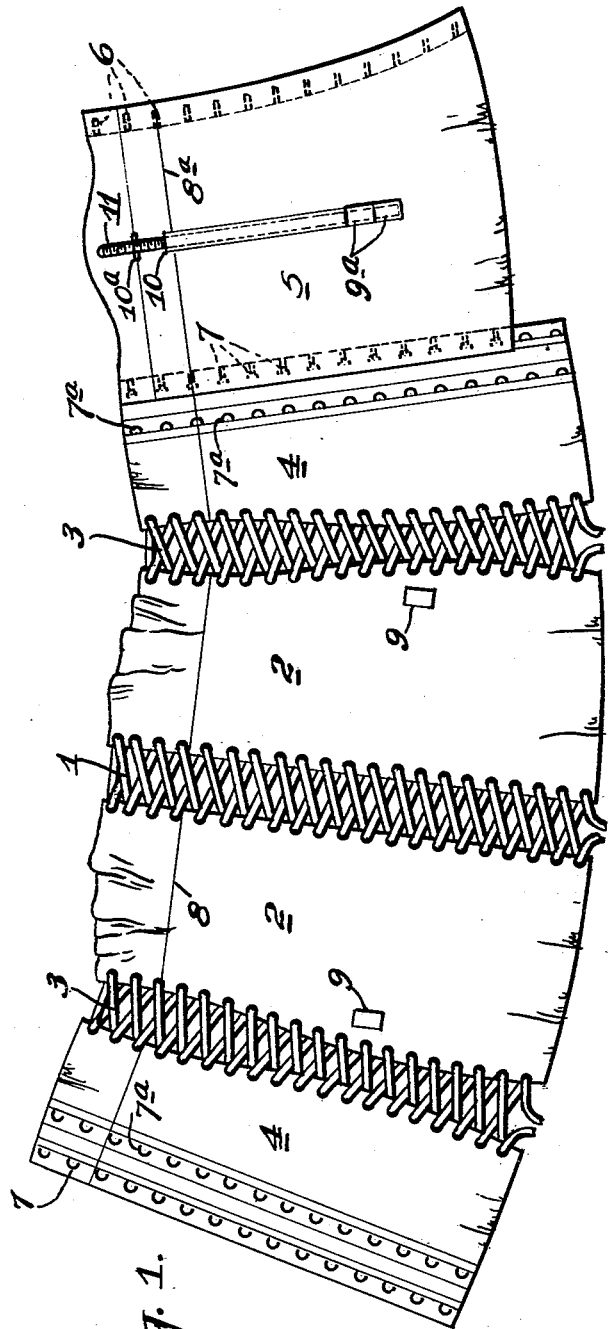

Sept. 26, 1933.   H. N. GRINAGER ET AL   1,928,101
FITTING GARMENT
Filed Dec. 3, 1929   2 Sheets-Sheet 2

WITNESS
A. B. Wallace

INVENTORS
Harris N. Grinager
George E. Ongley
Ruth R. Nassoiy
By Brown-Critchlow
Attorneys Patented Sept. 26, 1933

1,928,101

UNITED STATES PATENT OFFICE 1,928,101

FITTING GARMENT

Harris N. Grinager, George E. Ongley, and Ruth R. Nassoiy, Niagara Falls, N. Y., assignors to The Spirella Company Incorporated, Niagara Falls, N. Y., a corporation of New York Application December 3, 1929. Serial No. 411,257

8 Claims. (Cl. 33—15)

This invention relates to fitting garments for use in obtaining measurements for figure-training garments.

Figure-training garments have heretofore been made up from measurements of the uncorseted figure of the individual for whom they are intended. Uncorseted measurements have been necessary because these garments depend fundamentally upon supporting the figure in accordance with natural anatomical relations, and the proper measurements and correlation of measurements was not possible from prior corseted measurements.

Uncorseted measurements, however, cannot be used directly for exact designing of such garments. A garment made in strict accordance with such measurements will merely conform to the figure as it is, instead of providing the comfortable, anatomically proper and healthful support of which figure-trained garments are capable. At present, therefore, figure-training garments have been made up from patterns reduced from the uncorseted measurements, suitable allowances being made to produce a garment in accordance with figure-training principles.

The allowances or balancing of uncorseted measurements, while arrived at in part from a study of type figures, depends in large part for their success upon the skill and judgment of the fitter. The obtaining of accurate measurements is in some cases difficult. For example, the measurement of the distance from the waist line to the pelvic arch is difficult whether taken in standing or sitting position, but accurate measurement in both positions is essential for use in providing proper upward and backward support. Up to the present time, no means have been available for determining measurements from which figure-training garments may be made directly.

An object of this invention is to provide means for obtaining accurate measurements for use in making up correctly fitted figure-training garments, so as to eliminate the elements of personal skill of the fitter and the uncertainty of uncorseted measurements.

A particular object is to provide means of the type referred to comprising a fitting garment adapted to be adjusted to any of individual figures for producing the effect of a properly fitted figure-training garment; and especially a fitting garment having means for accurately measuring the distance from the waist line to the pelvic arch in both sitting and standing positions.

Figure 4:
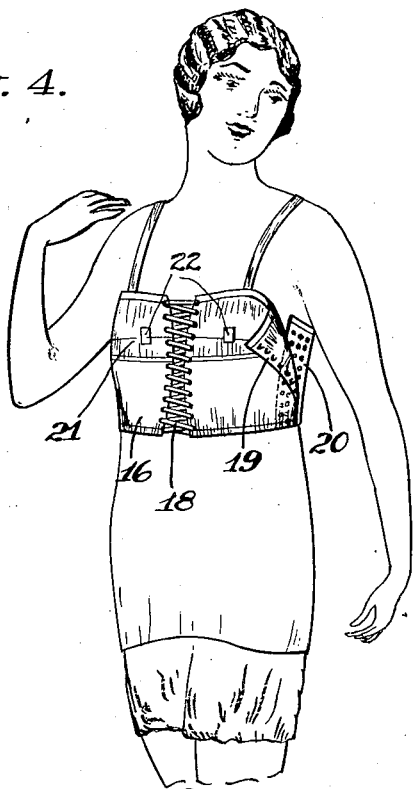
Figure 2:
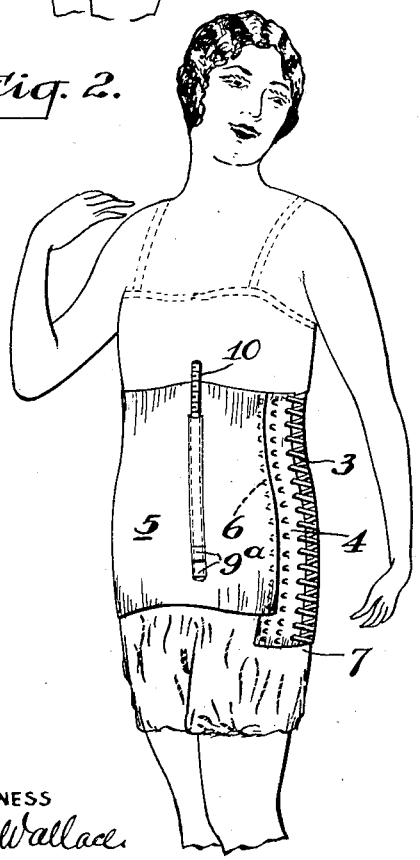
Figure 5:
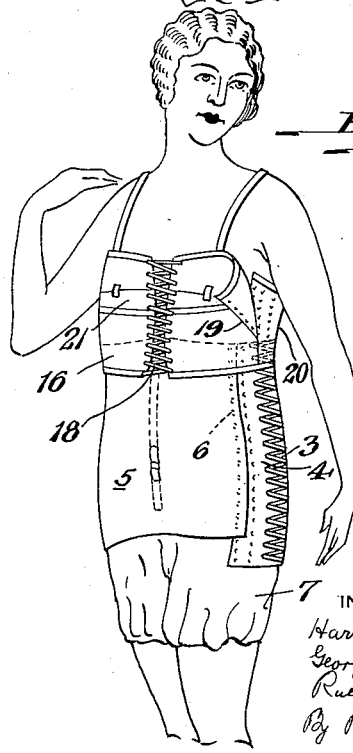

The preferred embodiment of the invention is shown in the accompanying drawings, in which Fig. 1 is a view of the lower portion of a fitting garment, showing it extended; Fig. 2 is a perspective of the garment shown in Fig. 1 fitted for measurement; Figs. 3 and 4 views respectively similar to Figs. 1 and 2, showing the upper, or auxiliary portion of the garment; and Figs. 5 and 6 are front and rear perspective views, respectively, showing the two portions of the garment fitted to the figure for supporting it correctly and obtaining accurate measurements.

In accordance with the invention, there is provided a fitting garment which is adjustable to each of individual figures to effect an anatomically natural support similar to that of a correctly designed and fitted figure-training garment, and from which measurements may be taken for accurately making up figure-training garments which reproduce the result effected by the fitting garment. The garment may comprise a single portion for use in obtaining measurements for corsets, girdles, and the like. However, in the preferred embodiment, it comprises two parts, an upper or brassière portion, and a lower or corset portion. Means are provided in the corset portion for determination of the distance from the pelvic arch to the waist line. In this manner, correctly fitted figure-training garments such as corsets, girdles, brassières, combination garments, and the like, may be made directly from the measurements.

Having reference now to the drawings, Fig. 1 shows a fitting garment which may be used in taking measurements for corsets and girdles, and for the lower portion of combination garments. This garment comprises back, side and front panels connected to be adjustably conformed to the figure in accordance with figure-training principles. In the preferred embodiment, the back and side, or under-arm, adjustment is obtained by a center lacer 1 disposed in a back panel 2, and side lacers 3 connect side panels 4 to the back panel. A front panel 5 is adapted to be vertically adjusted, and to this end each of the side edges of the front panel is provided with hooks 6 which engage eyes 7 connected to the edges of side panels 4.

The garment is also adapted to have its circumferential size varied. This may be, and preferably is, accomplished by providing a plurality of spaced rows 7a of the eyes 7, as shown particularly in Fig. 1. This provides for varying the garment opening within substantial limits, to adapt it to a wide variety of individual figures.

Particular features of the garment reside in means for reducing or substantially eliminating the personal factor heretofore involved in fitting and taking measurements. To this end, the garment is provided with a basic waist line and with means so related thereto as to locate the hip line correctly when the garment is placed with the standard waist line corresponding to the natural waist line of the individual. In the garment shown, a standard waist line 8 is stamped or otherwise indicated on the outer side of the garment, and loops 9 are provided in proper relation to line 8 to fix the hip line. Means other than loops may be used for this purpose, such as a reference line, but loops are preferred because a tape measure may be threaded through them and will be correctly situated for convenient measurement.

In the use of this garment, it is positioned with basic waist line 8 corresponding to the natural waist line of the individual. Preliminary adjustment is now made by connecting the front panel to whichever rows of eyes 7 may be necessary to obtain an approximate fit. Lacers 1 and 3 are now adjusted to effect a natural and figure-training support, as will be understood by those skilled in the art. In order to provide proper upward and backward support, front panel 5 is moved upwardly or downwardly as need be.

It will be seen that this garment embodies the adaptability to individual figures which is essential in obtaining corseted measurements from which accurately to construct correctly fitted figure-training garments. The abdominal and pelvic support may be shifted according to need, proper adjustment is attained by the lacers, and wide variations in the garment opening are provided for.

The garment having been positioned with its standard waist line properly situated, and having been adjusted as described, measurements may be taken for use in making up the desired garments. Because the waist and hip lines are properly located, all measurements follow correctly, and all figures can be fitted properly.

A particular feature of this garment resides in the provision of means for accurately determining the distance from the pelvic arch to the waist line. For proper fitting, and to provide maximum comfort, this distance must be obtained in both sitting and standing positions, and heretofore exact measurements in both positions has been realizable only with difficulty.

As shown in Figs. 1 and 2, center panel 5 is provided centrally of its outer side with a vertical pocket having at its upper end an opening or buttonhole 10, for receiving a sliding rule 11. The pocket extends substantially to the bottom of the panel, and the rule, which is graduated in any desired units, is preferably of a stiff but flexible nature, and may suitably be made from boning.

In making this measurement, in a standing position, for example, the rule is moved upwardly or downwardly to bring its lower end to the pelvic arch, and the distance to the waist line may then be read directly. This measurement is then verified in a sitting position. In this manner a decision may be reached as to the correct measurement for the figure in both standing and sitting positions. It has not been possible heretofore to do this with accuracy and for all figures. This improvement in measurements consequently materially improves the fit and makes the support provided more nearly ideal.

The center panel is further provided with a plurality of lines 8a spaced apart a distance corresponding to the increments by which the panel is vertically adjustable. At each of lines 8a there is provided a buttonhole 10a for accommodation of rule 11. In any position of the panel, one of lines 8a will correspond with standard waist line 8, thus giving the basic waist line for use in this pelvic arch-waist line measurement. Similarly, the panel is provided with spaced loops 9a one of which will align with loops 9 on vertical adjustment of the panel.

Although the garment just described may be used for many purposes, it is preferred to use a two-piece garment having a corset portion of the type just described, and an upper or brassière portion. The brassière fitting portion, shown in Figs. 3 and 4, comprises a back panel 15 and a front panel 16 provided respectively with center laces 17 and 18, and connected along their edges by hooks and eyes. In the garment shown, hooks 19 are provided along the edges of the front panel, and the back panel is provided with a plurality of spaced rows of eyes 20. As in the case of the lower portion of the garment, this portion is thus adjustable as to size, and its fit may be adjusted.

The garment is preferably provided with a standard bust line 21. When this line is properly located, the various measurements follow correctly. Loops 22 may be connected at spaced intervals along line 21, to hold a tape measure in position for convenient use.

The upper and lower portions just described may be used separately to obtain measurements from which to make brassières, and girdles or corsets, respectively. However, it is usually desirable, and it is generally preferred, to fit the individual properly with both portions before taking measurements for any type of garment. This is necessary, of course, in order to obtain measurements for a full figure training garment, such as a brassière-girdle. But it is equally desirable in obtaining measurements for girdles or brassières because of the fact that individual figures vary widely in type and character.

The application of both portions of the fitting garment affords full molding control of the figure on figure training principles, irrespective of factors such as abnormalities in abdominal flesh, sagged muscles, and the like. This results from the fact that each portion effects proper control of the region of the body which it encloses. Since proper control of one such body region may either not correct another region, or may, with some abnormal figures, even require correction of another region, the two portions of our fitting garment act in cooperation not only to correct the respectively enclosed body regions, but to modify the results caused by each other so as to effect perfect fitting control. Therefore, complete molding of the figure by fitting of both portions of the fitting garment provided by this invention insures finished garments which most satisfactorily effect figure training in the individual, i. e. which cooperate to cause the bony framework and muscles to work in natural unison and support the organs naturally. This provides the healthful support of the vital organs, the pleasing foundation appearance of anatomically correct support, and maximum comfort and health to the wearer.

Such application of both portions of the garment is illustrated in Figs. 5 and 6, and is accomplished in the following manner. With the individual standing in normal posture the lower portion of the fitting garment is applied and fitted correctly in the manner explained hereinbefore. Preferably the distance from the pelvic arch to the waist line is now determined in both standing and sitting positions. The sliding rule is then removed, and the upper portion of the garment is fitted to the figure, as just described, and as shown in Fig. 4. This completes molding of the figure. An important result follows the proper molding of the figure by the use of both portions of the garment. This permits the individual to experience the feeling and appearance of anatomically correct fitting, and to realize in advance exactly the result which will be obtained with a finished garment made from measurements taken from such correct fitting with both portions. Having demonstrated these vital features, measurements may then be taken from the properly corseted figure, or, if desired, such measurements may be made as each portion is applied and fitted correctly. Such measurements taken from a properly supported figure are accurate, and a finished garment made from them exactly reproduces the results demonstrated to the individual with the fitting garment.

Thus it will be seen that the invention provides a means of properly fitting individual figures in accordance with figure-training principles, by means of a standard garment, and that measurements may be taken therefrom for accurately making figure-training garments directly. This has not been accomplished previously, and it provides for better fitting, both from the standpoint of health and comfort, as well as reducing the element of personal skill and increasing precision of measurement.

We claim:

1. In a fitting garment adapted to be fitted in an anatomically correct manner to individual figures to demonstrate proper fit and to obtain accurate measurements for figure-training garments, the combination of a back portion, unitary side portions, adjusting means associated with said portions, a front portion connected at its edges to said side portions for rapid vertical adjustment relative to said side portions, means for adjusting the garment opening within substantial limits, and vertically adjustable means associated with the front portion for obtaining the distance from the waist line to the pelvic arch.

2. In a fitting garment adapted to be fitted in an anatomically correct manner to individual figures to demonstrate proper fit and to obtain accurate measurements for figure-training garments, comprising side and back portions, lacers connecting said back and side portions, a unitary front panel removably connected at its edges to said side portions and vertically adjustable with respect thereto, and vertically adjustable means associated with said front panel cooperating therewith to obtain accurate measurement of the distance from the waist line to the pelvic arch.

3. In a fitting garment adapted to be fitted in an anatomically correct manner to individual figures to demonstrate proper fit and to obtain accurate measurements for figure-training garments, comprising side and back portions, a center lacer in said back portion, side lacers connecting the side panels to the edges of the back panel, a separate unitary vertically adjustable front portion provided along its edges with hooks, a plurality of spaced rows of eyes connected to the side panels, and a vertically adjustable rule disposed centrally of said front portion and cooperating therewith to permit accurate measurement of the distance from the waist line to the pelvic arch.

4. A two-element fitting garment adapted to be fitted in an anatomically correct manner to individual figures, comprising upper and lower elements, said upper element including front and back panels, a lacer associated with one of said panels, and means for varying the garment opening within substantial limits, and said lower element including back and side panels, lacers associated with said back and side panels, a closed front panel, connecting means associated with the edges of said front and side panels for rapid vertical adjustment of the front panel relative to the rest of the lower element and for varying the garment opening within substantial limits, the upper and lower elements being provided respectively with standard bust and waist lines, and said elements cooperating to mold individual figures in an anatomically correct manner, and while thus fitted acting both to demonstrate to the wearer the feel and appearance of such correct fit, and to permit taking of measurements from which accurately to make a finished garment for the individual productive of the same figure training results.

5. A two-element fitting garment adapted to be fitted in an anatomically correct manner to individual figures, comprising an upper brassière element including center laced back and front panels, hooks associated with the edges of one of said panels, and a plurality of rows of eyes associated with one edge of the other of said panels; and a lower corset element comprising a back panel, side panels provided adjacent their front edges with a plurality of rows of eyes, a center lacer in the back panel, and lacers connecting the side panels to the edges of said back panel, a separate vertically adjustable front panel provided with hooks for connection to said eyes, and a vertically adjustable rule associated with the center of said front panel for measuring the distance between the waist line and the pelvic arch in both standing and sitting positions, said elements being provided with standard waist and bust lines, and the elements cooperating to mold individual figures in an anatomically correct manner, and while thus fitted acting both to demonstrate to the wearer the feel and appearance of such correct fit, and to permit taking of measurements from which accurately to make a finished garment for the individual productive of the same figure training results.

6. A fitting garment for use in fitting individual figures, comprising in combination adjustably connected front and back figure-forming garment portions, and vertically adjustable means associated with said front portion for determining the distance between the waist line and the pelvic arch in both sitting and standing positions, said garment being applicable to mold individual figures to permit an individual to experience the feel and appearance of such fit and as thus fitted to permit obtaining measurements from which accurately to make a finished garment for the wearer productive of that fit.

7. A fitting garment for use in fitting individual figures, comprising in combination back and vertically adjustable centrally closed front figure-training garment portions, and a slidable rule disposed centrally of the front portion for movement vertically thereof for accurately measuring the distance from the waist line to the pelvic arch, said garment being applicable to mold individual figures to an anatomically correct form and while thus fitted acting both to permit the individual to experience the feel and appearance of such correct fit, and to permit taking of measurements from which accurately to make a finished garment for the wearer productive of the same figure-training results.

8. In a fitting garment to be fitted in an anatomically correct manner to individual figures, the combination of separate back and closed front portions, detachable means connecting said portions at their edges for rapid vertical adjustment of said front portion relative to the rest of the garment, and lacing means associated with one of said portions for conforming the garment to the figure, said portions cooperating to provide an upward and backward support from the pelvic region as a base and to mold individual figures to which it is applied in an anatomically correct manner, and while thus fitted acting both to demonstrate to the wearer the feel and appearance of such correct fit and also to permit the taking of measurements from which to make a finished garment for that individual accurately productive of the demonstrated fit and figure-training results.

HARRIS N. GRINAGER.
GEORGE E. ONGLEY.
RUTH R. NASSOIY.